United States Patent [19]

Kerschbaumer

[11] Patent Number: 5,219,003
[45] Date of Patent: Jun. 15, 1993

[54] MULTI-LAYERED TUBES HAVING IMPACT RESISTANCE-MODIFIED POLYAMIDE LAYERS

[75] Inventor: Franz Kerschbaumer, Chur, Switzerland

[73] Assignee: EMS-Inventa AG, Switzerland

[21] Appl. No.: 661,669

[22] Filed: Feb. 27, 1991

[30] Foreign Application Priority Data

Mar. 5, 1990 [DE] Fed. Rep. of Germany ....... 4006870

[51] Int. Cl.⁵ .................................................. F16L 9/14
[52] U.S. Cl. ................................. 138/137; 138/125; 138/126; 138/141
[58] Field of Search .............. 138/118, 137, 123, 124, 138/125, 126, 140, 141, 177, 178

[56] References Cited

U.S. PATENT DOCUMENTS

| | | | |
|---|---|---|---|
| 2,800,145 | 7/1957 | Peierls et al. | 138/137 |
| 3,251,381 | 5/1966 | Koch | 138/125 |
| 3,561,493 | 2/1971 | Maillard | 138/137 |
| 3,584,656 | 6/1971 | Assendelet et al. | 138/137 |
| 3,682,201 | 8/1972 | Atwell et al. | 138/125 |
| 3,762,986 | 10/1973 | Rhuta et al. | 138/137 |
| 4,243,724 | 1/1981 | Strutzel et al. | 138/137 |
| 4,410,661 | 10/1983 | Epstein | 138/137 |
| 4,510,974 | 4/1985 | Natori et al. | 138/137 |
| 4,880,036 | 11/1989 | Kitami et al. | 138/137 |
| 4,881,576 | 11/1989 | Kitami | 138/137 |
| 4,905,734 | 3/1990 | Ito | 138/137 |
| 4,907,625 | 3/1990 | Ito et al. | 138/125 |
| 5,038,833 | 8/1991 | Brunnhofer | 138/125 |
| 5,076,329 | 12/1991 | Brunnhofer | 138/137 |

Primary Examiner—James E. Bryant, III
Attorney, Agent, or Firm—Jordan B. Bierman

[57] ABSTRACT

Cold impact-resistant tubing especially useful as a fuel line for motor vehicles which is stable in length, has a brief thermal overload capacity, and consists of at least three layers of at least two different mutually compatible polyamides. The tubing also preferably has an internal and an external layer of impact resistance-modified polyamide, with or without a plasticizer, and a barrier between the layers of impact resistance modifier-free homopolyamide, copolyamide or blends thereof.

16 Claims, 3 Drawing Sheets

FUEL PERMEATION THROUGH PIPES 8 x 1 mm
T = 70°C  4 bar unleaded supergrade petrol
+ 5% ethanol, 3% methanol, 2% isopropanol FUEL PERMEATION THROUGH PIPES 8 x 1 mm
T = 70°C  4 bar leaded supergrade petrol

MULTI-LAYERED TUBES HAVING IMPACT RESISTANCE-MODIFIED POLYAMIDE LAYERS

The invention relates to a fuel line which is made up of several layers of polyamide.

BACKGROUND OF THE INVENTION

Fuel lines of polyamide 11 and 12 have been fitted in motor vehicles for a long time, but suffer from the disadvantage that considerable permeation of conventional fuels through the walls of such lines occurs. This is particularly undesirable due to the requirements of environmental protection and safety which have arisen in recent years.

A further disadvantage of such tubing resides in the considerable absorption capacity of the polymers toward individual components of the fuels; this can lead to swelling and changes of length in the walls or wall layers of the tubing. Different degrees of swelling in different wall layers are particularly detrimental.

Developments have therefore taken place in order to improve the so-called mono-pipes consisting of a single homogeneous layer; e.g. polyamide 11 or polyamide 12. One possible improvement resides in the transition to multi-layered tubes with special barrier layers of polymers.

A fuel line in which ethylene/vinyl alcohol copolymers are associated with polyamide layers is known from DE 35 10 395 C2. However, the adhesion between these layers is so slight that they delaminate easily. Corrosive chemicals, such as scattered salt, can penetrate between the layers at the delaminated pipe ends. Furthermore, the adhesion at fittings having mandrel profiles is greatly reduced. In addition, the cold impact resistance of such pipes is so low that they cannot withstand cold impact tests according ISO 7628 and SAE J 844d, because the extremely brittle polyethylene vinyl alcohol layer has been shifted inward in the tubing wall.

DE 38 27 092 C1 describes a fuel line in which thermoplastic polyester elastomers are combined with polyamide 6 and a polyethylene vinyl alcohol internal layer. In this case also there is only slight adhesion between the layers, so the disadvantages described hereinbefore also arise.

BRIEF DESCRIPTION OF THE INVENTION

It is therefore an object of the invention to provide a fuel line for motor vehicles which exhibits permeation with all normal fuels which is low enough to satisfy the current regulations governing environmental protection and safety, without having the above-mentioned disadvantages.

The fuel line according to the invention resists cold impact, has a permeation resistance which is satisfactory for the current regulations governing environmental protection and safety, does not delaminate, is stable in length, has a brief overload capacity at temperatures normally occurring in the engine compartment of a motor vehicle, and is also inexpensive to produce.

DETAILED DESCRIPTION OF THE INVENTION

Figure 1:
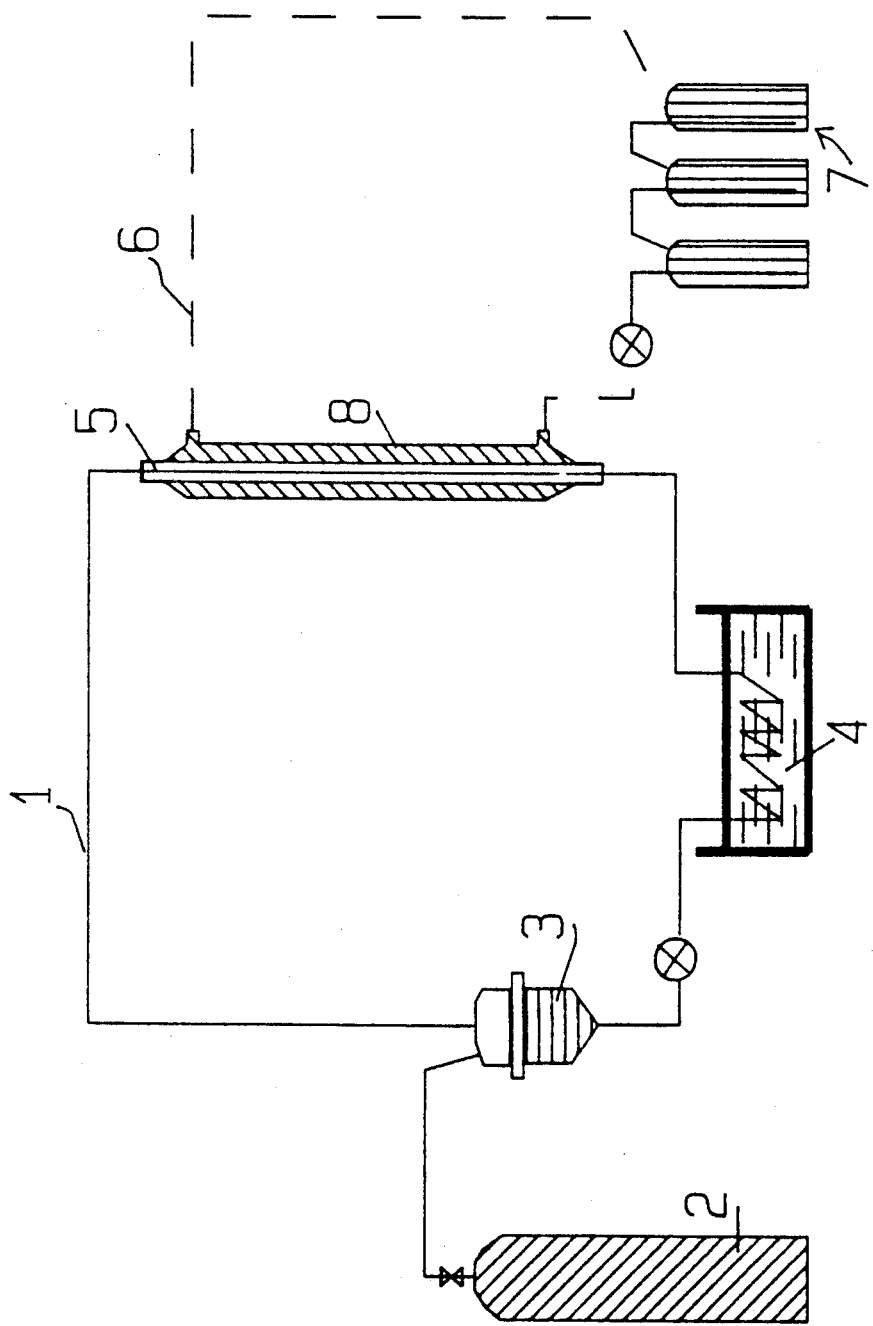

Known mono-pipes cannot withstand a bursting pressure test even at 170° C. On the other hand, multi-layered piping according to the invention withstands a bursting pressure of 7 bar even at 180° C. for a short time, i.e. one to two hours. This is of considerable importance with regard to the safety of fuel lines in cases in which the engine overheats briefly; for example, if the cooling system begins to boil.

Surprisingly, it has been found that the cold impact resistance of a multi-layered fuel line can be very high if a brittle barrier layer forms the middle layer of the tubing. In this case, its the impact resistance achieved by the impact resistance of the internal and external layer.

It has also been found that unmodified polyamide 66 and polyamide elastomers based on polyamide 12 are eminently suitable as barrier layers. This barrier effect in fuel lines is required, in particular, with respect to the aromatic constituents of the fuels which are usually highly toxic. Polyamide 66 is superior to polyamide 6 and, in particular, the polyamides from long-chained monomers such as PA 11, PA 12, and PA 12,12 are advantageous.

Polyamide 66 is so compatible with polyamide 6 on the one hand and polyamides 11 and 12 on the other hand that no delamination could be observed in the tubing made from such layers according to the invention. This same advantage has also been observed for polyamide elastomers based on polyamide 12 blended with copolyamides based on polyamide 6 and polyamide 12 monomers.

Therefore, the multi-layered fuel lines of the invention have an external layer consisting of impact resistance-modified types of polyamide which can contain plasticizer, and of a middle barrier layer consisting of a polyamide substantially free of impact resistance modifiers. It has been found especially preferable to use polyamide 6,6 or blends of polyamide elastomers, particularly polyetheresteramide based on the monomers of polyamide 11 or 12 with copolyamides. As to the copolyamides, those based on monomers containing 6, 11 or 12 carbon atoms are most preferred.

The internal layer of the tubing of the invention preferably consists of polyamide 6; the impact resistance thereof can also be modified to provide a particularly preferred embodiment. The impact resistance modifiers of the present invention are generally polymeric rubbery components, i.e. ethylene and other olefinic components. They serve to increase the impact resistance of the materials with which they are blended. These materials are well known to those of ordinary skill.

Multi-layered combinations wherein the internal layers are of impact resistance-modified polyamide 6 and the external layers are of impact resistance-modified polyamide 6, 11, 12, or 12,12 are worthy of special mention. A further preferred embodiment has substantially the same layer thickness in the internal and external layers, the thickness being between 0.2 and 1.0 mm. Thicknesses of 5 to 25% of the overall wall thickness are adequate for the barrier layers. Thicknesses of 0.1 to 0.5 mm are particularly preferred for the barrier layer.

The fuel lines according to the invention can obviously be made up of more than three layers if the principle of the impact resistance-modified external layer and a barrier layer between internal and external layer(s) is observed and the layer materials are compatible.

The multi-layered fuel lines according to the invention are preferably produced by combining streams of melt in a co-extrusion device. Such co-extruded fuel lines have been tested for both their cold impact resistance (according to SAE J 844d and ISO 7628) and their fuel permeation.

The results of the cold impact tests are reproduced in Table 1. They have been carried out on pipes having an external diameter of 8 mm and a wall thickness of 1 mm; the layer structures of which are indicated in Table 1.

FAM is a blend of 50% toluol, 30% isooctane, 15% isobutene, 5% ethanol.

Figure 5:
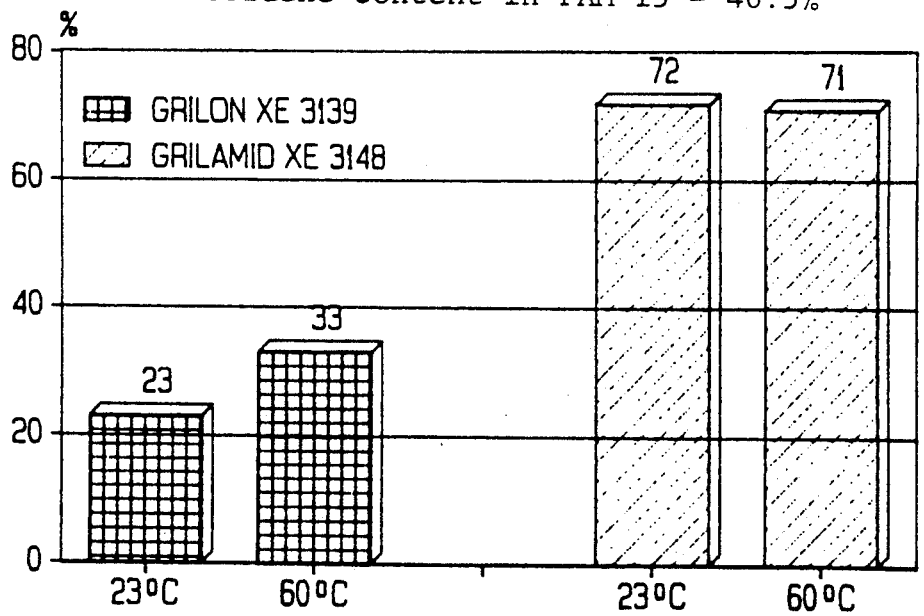

FAM 15 in FIG. 5 is a blend of 84,5% FAM, 0,5% water, 15% methanol.

TABLE 1

| Example | Layer structure | | | Pipe examples: External diameter: 8 mm Total wall thickness: 1 mm | Cold impact with striker SAE J 844 d | Cold impact with striker ISO 7628 |
|---|---|---|---|---|---|---|
| 1 | Grilon XE 3139 | | | 0.45 mm internal | Successful | Successful |
| | Grilon T300GM | | | 0.10 mm middle | | |
| | Grilon XE 3139 | | | 0.45 mm external | | |
| 2 | Grilon XE 3139 | | | 0.60 mm internal | Successful | Successful |
| | Grilamid ELY20NZ | 50% | → | 0.20 mm middle | | |
| | Grilon CA6E | 50% | | 0.20 mm external | | |
| Comparison example | Grilamid XE 3148 Grilon XE 3139 EVAL F Grilon XE 3139 | | | 0.60 mm internal 0.10 mm middle 0.30 mm external | Unsuccessful | Unsuccessful |

The polyamides mentioned in Tables 1 to 5 are

| GRILON | XE3139 | an impact resistance-modified PA 6. |
|---|---|---|
| GRILON | T300 GM | an impact resistance modifier-free PA 66. |
| GRILAMID | ELY20NZ | an impact resistance-modified polyamide elastomer. |
| GRILON | CA6E | an amorphous copolyamide based on caprolactam/laurolactam. |
| GRILAMID | XE3148 | an impact resistance-modified PA 12. |
| GRILON | R47HW | a high-viscosity, impact resistance-modified PA 6 with defined plasticezer content. |
| GRILAMID | L25W20 | a semiflexible, medium viscosity polyamide 12 with defined low plasticizer content. |
| GRILAMID | L25W40 | a flexible, medium viscosity polyamide 12 with defined higher plasticizer content. |

The polyamides listed above are commercial products of EMS-Chemie AG, Zurich, Switzerland.

Figure 2:
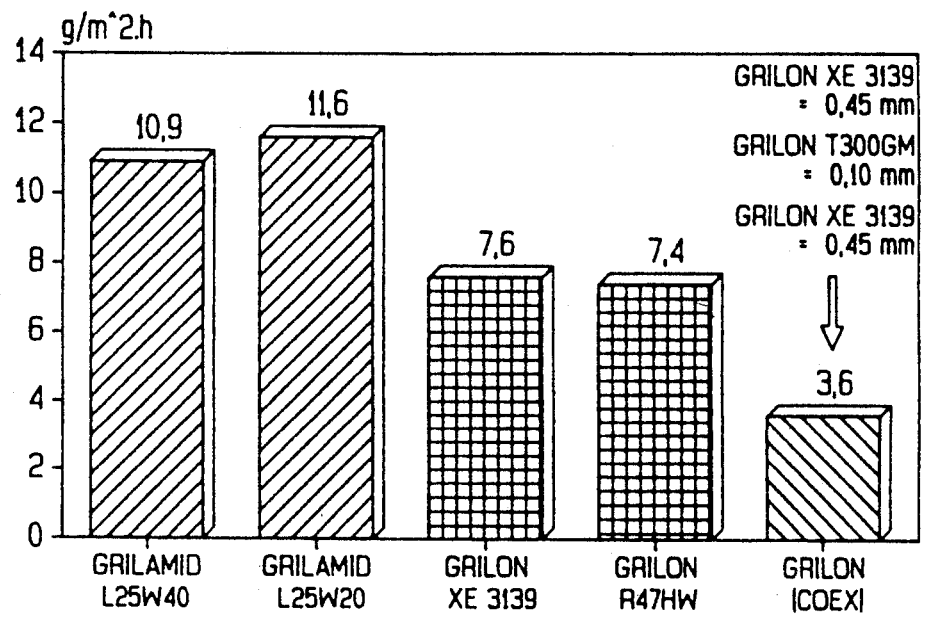
Figure 3:
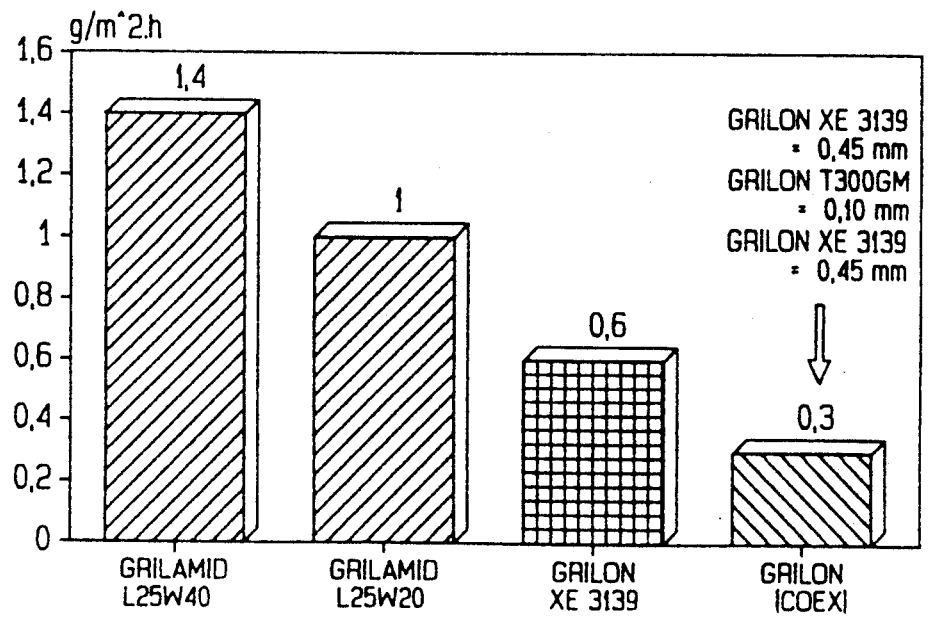
Figure 4:
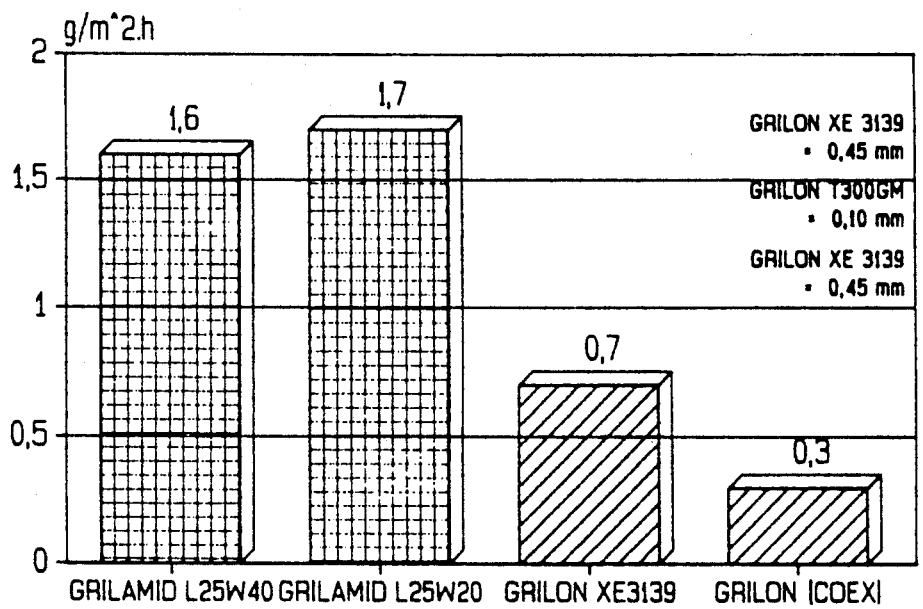

In the accompanying drawing, constituting a part hereof, and in which like reference characters indicate like parts, FIG. 1 is a diagrammatic view of a permeability testing device;

FIGS. 2-4 are bar graphs indicating the permeability of various polyamide resins to various fuels; and FIG. 5 is a graph similar to FIGS. 2-4 showing permeability at different temperatures.

The apparatus comprises fuel circuit 1 containing air chamber 3 and passing through heating system 4 and a length of piping 5 to be tested. Pressure bottle 2 is connected to air chamber 3 and serves to maintain a pressure of 4 bar in fuel circuit 1. The fuel flows in fuel circuit 1 at about 10 liters per hour and is heated to 70° C. in heating system 4. Pipe 5 has an external diameter of 8 mm and a wall thickness of 1 mm.

The apparatus also comprises a carrier circuit 6 which is connected to both ends of the length of piping 5 to be tested. The carrier circuit 6 is guided through an arrangement 7 of activated carbon filters.

The fuel which has permeated through the wall of piping 5 enters enclosure 8 and is then conveyed over activated carbon filter 7 in the carrier circuit 6 by 100 ml/min of nitrogen, and its weight after 300 hours is determined.

While only a limited number of specific embodiments of the invention have been expressly disclosed it is, nonetheless, to be broadly construed and not to be limited except by the character of the claims appended hereto.

I claim:

1. A tube for conveying motor vehicle engine fuel comprising three layers having a combined thickness, said three layers including a barrier, an external layer and an internal layer, each of said three layers are made of polyamides where at least two of the polyamides are different and mutually compatible materials, said internal and external layers are of impact resistance-modified polyamide, and said barrier is a polyamide having substantially no impact resistance modifier.

2. The tube of claim 1 wherein said internal and external layers are of impact resistance-modified polyamide, and said barrier is a polyamide having substantially no impact resistance modifier.

3. The tube of claim 1 wherein said internal and external layers contain plasticizers.

4. The tube of claim 1 wherein said barrier is of polyamide 6,6.

5. The tube of claim 1 wherein said barrier is a blend of at least one polyamide elastomer and a copolyamide.

6. The tube of claim 5 wherein said elastomer is a polyetheresteramide.

7. The tube of claim 5 wherein said copolyamide is derived from monomers having 6 to 12 carbon atoms.

8. The tube of claim 1 wherein said internal and external layers are of substantially equal thicknesses.

9. The tube of claim 1 wherein said internal and external layers are 0.2 to 1.0 mm in thickness.

10. The tube of claim 1 wherein said barrier has a thickness of 5% to 25% of said combined thickness.

11. The tube of claim 1 wherein said barrier has a wall thickness of 0.1 to 0.5 mm.

12. The tube of claim 5 wherein said internal layer is of impact resistance-modified polyamide 6 and said external layer is of impact resistance-modified polyamide 12.

13. The tube of claim 6 wherein said internal layer is of impact resistance-modified polyamide 6 and said external layer is of impact resistance-modified polyamide 12.

14. The tube of claim 7 wherein said internal layer is of impact resistance-modified polyamide 6 and said external layer is of impact resistance-modified polyamide 12.

15. The tube of claim 4 wherein said internal and external layers are of impact resistance-modified polyamide 6.

16. The tube of claim 1 produced by co-extrusion of said three layers.

* * * * *